United States Patent

Geyer et al.

[11] 4,354,473
[45] Oct. 19, 1982

[54] INJECTION INSTANT ADJUSTER FOR INTERNAL COMBUSTION ENGINES

[75] Inventors: Gerhard Geyer, Munich; Heinz Kuschmierz, Gerlingen, both of Fed. Rep. of Germany

[73] Assignee: Robert Bosch GmbH, Stuttgart, Fed. Rep. of Germany

[21] Appl. No.: 219,137

[22] Filed: Dec. 22, 1980

[30] Foreign Application Priority Data

Dec. 22, 1979 [DE] Fed. Rep. of Germany ....... 2952219

[51] Int. Cl.³ .................................... F02M 39/00
[52] U.S. Cl. ............................. 123/501; 464/3
[58] Field of Search ................... 123/501; 64/25

[56] References Cited

U.S. PATENT DOCUMENTS

| | | | |
|---|---|---|---|
| 3,951,118 | 4/1976 | Henson | 123/501 |
| 4,132,202 | 1/1979 | Nakayama et al. | 123/501 |
| 4,227,498 | 10/1980 | Eberl | 123/501 |
| 4,304,205 | 12/1981 | Bauer et al. | 123/501 |

FOREIGN PATENT DOCUMENTS

| | | | |
|---|---|---|---|
| 188965 | 3/1957 | Austria | 123/501 |
| 816498 | 7/1959 | United Kingdom | 64/25 |
| 836813 | 6/1960 | United Kingdom | 123/501 |
| 1318033 | 5/1973 | United Kingdom | 123/501 |

| | | |
|---|---|---|
| 622998 | 8/1978 | U.S.S.R. ................. 123/501 |

Primary Examiner—Ira S. Lazarus
Assistant Examiner—Magdalen Moy
Attorney, Agent, or Firm—Edwin E. Greigg

[57] ABSTRACT

An injection instant adjuster for internal combustion engines is proposed, by means of which the mutual rotary position of an off-drive element relative to a driving element is variable at least in accordance with rpm. The injection instant adjuster includes at least two adjusting cams acting as the adjusting mechanism, which during their rotary movements, effected by control elements, control a "late" adjustment ($\alpha$) of the instant of injection during a first partial rotation ($\gamma$) which precedes the "early" adjustment ($\beta$) controlled during the further partial rotation ($\delta$). This is possible by means of a suitable selection of the outset position of an adjusting bolt. A detent in the adjusting curve, during which no adjustment takes place within a predetermined rpm range, is controllable at the transition between "late" and "early" adjustment by means of the spring sets comprising at least two adjuster springs, whenever the second adjuster spring is installed in the adjuster with initial stress, with the interposition of a spring plate and acting counter to the adjusting force of the control element.

8 Claims, 5 Drawing Figures

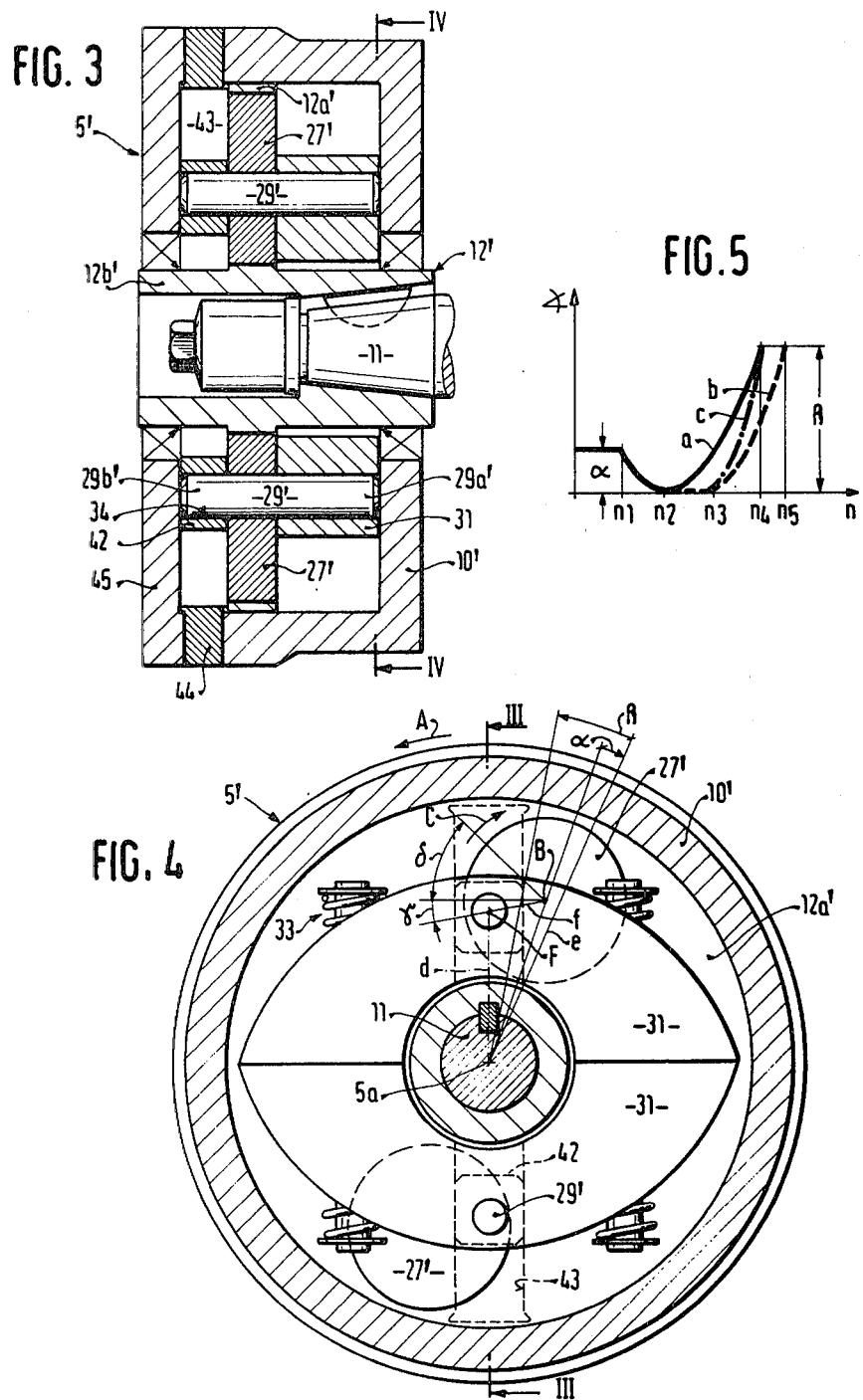

INJECTION INSTANT ADJUSTER FOR INTERNAL COMBUSTION ENGINES

BACKGROUND OF THE INVENTION

The invention is based on an injection instant adjuster for internal combustion engines as described herein. An injection instant adjuster of this kind is already known from French Pat. No. 779,910, in which the adjusting cam is rotated by a flyweight, acting as a control element, and the relative rotary position of an off-drive element is thereby varied relative to a driving element of the adjuster. In one application of the described adjuster, the driving element is connected with the drive shaft of the engine and the off-drive element is connected with the camshaft of the injection pump, and it is only an adjustment toward "early" of the instant of injection which is controlled. In this adjuster, the maximal possible adjusting angle can be varied by means of varying the eccentricity and length of the guide groove for the adjusting bolt; or the adjusting direction can be adapted to the rotary direction of the adjuster by means of shifting the outset point of the eccentric adjusting bolt.

Adjusters for the instant of injection which are actuated by centrifugal force are also known from German Pat. No. 1,022,419 and German Offenlegungsschrift No. 27 25 414, in which the flyweights engage the adjusting cams of pairs of cams which are embodied as adjusting and compensation cams and which serve as adjusting means. These adjusters for the instant of injection, because of their structurally dictated self-locking feature, have a reduced load dependence in the event of sudden load stresses, and accordingly also have a reduced tendency to wear more or less than the adjusters described first above, and these adjusters also cause less noise. These adjusters are again designed only for controlling adjustment toward "early", and the pairs of cams are installed in such a manner, depending on the rotary direction of the adjuster, that only an adjustment toward "early" is attained.

In the known injection instant adjusters, equipped with adjusting cams, only an adjustment toward "early" can be controlled; or, if the adjusting cams are installed in a reversed position, only an adjustment toward "late" can be controlled. An adjustment of the instant of injection toward "late" which precedes the conventional adjustment toward "early" is not controlled in the known injection instant adjusters. An injection adjusting device is known from German Offenlegungsschrift No. 24 58 109, in which two injection adjusters are disposed in series, one of which is a normal injection adjuster, controlling adjustment toward "early", and the other additionally effects an adjustment toward "late" at a given switchover rpm. This system is hydraulically controlled and is extremely expensive. It is accordingly the object of the invention to control a "late" adjustment preceding the normal "early" adjustment with a single injection instant adjuster, without providing for a reversal of movement of the control element.

OBJECT AND SUMMARY OF THE INVENTION

The instant of injection adjuster according to the invention has the advantage over the prior art that the desired adjustment toward "late" of the instant of injection preceding the adjustment toward "early" can be attained with the basic design already available of known cam-type injection adjusters and without additional structural parts being required.

With the characteristics disclosed herein, advantageous further modifications of and improvements to the injection instant adjuster disclosed can be attained.

One preferred embodiment of an injection adjuster, known from German Pat. No. 1,022,419 or German Offenlegungsschrift No. 27 25 414, having a compensation cam carrying the adjusting bolt and supported eccentrically in the adjusting cam, is attained by means disclosed herein. As a result of the fixed initial position of the adjusting cam, compensation cam and adjusting bolt, it is assured that when the rotary direction of the adjusting cam remains the same, in the manner of a crankshaft drive, the distance between the centers of the adjusting cam and the adjusting bolt are first increased and thereafter decreased; thus, while retaining the advantages of a cam-type injection adjuster equipped with a compensation cam, the desired adjustment toward "late" can be controlled.

As a result of the characteristics disclosed herein, the reversal point is fixed at which the adjustment toward "late" is changed into an adjustment toward "early". Further, in an adjuster known from French Pat. No. 779,910, having an adjusting bolt guided in a radial slit of a guide disc, this reversal point is determined by means of the characteristics disclosed herein.

In an injection adjuster actuated by centrifugal force in accordance with the combination of characteristics disclosed herein, the adjusting characterstics for the "late" adjustment and for the "early" adjustment as well is freely selectable over a wide range, independently of one another, by means of an appropriate selection of the adjusting springs, that is, by fixing their various initial stresses and spring strengths. As a result, the reversal point between "late" and "early" adjustment can be precisely fixed; and by applying further characteristics disclosed, a so-called "detent" is controlled in the reversal point between "late" and "early" adjustment, and in this detent, in a predetermined rpm range, no adjustment movement takes place. As a result of applying other characteristics, the "late" and "early" adjustments are controllable independently of each other, each by means of one of the adjusting springs.

The invention will be better understood and further objects and advantages thereof will become more apparent from the ensuing detailed description of two preferred embodiments taken in conjunction with the drawings.

BRIEF DESCRIPTION OF THE DRAWINGS

FIG. 3 is a longitudinal cross-sectional view taken along the line III—III in FIG. 4 through an injection adjuster which is illustrated as the second exemplary embodiment;

FIG. 4 is a cross-sectional view taken along the line IV—IV in FIG. 3; and

FIG. 5 is a diagram having adjusting curves plotted over the rpm which are attainable with the injection adjuster according to the invention.

DESCRIPTION OF THE PREFERRED EMBODIMENTS

Figure 1:
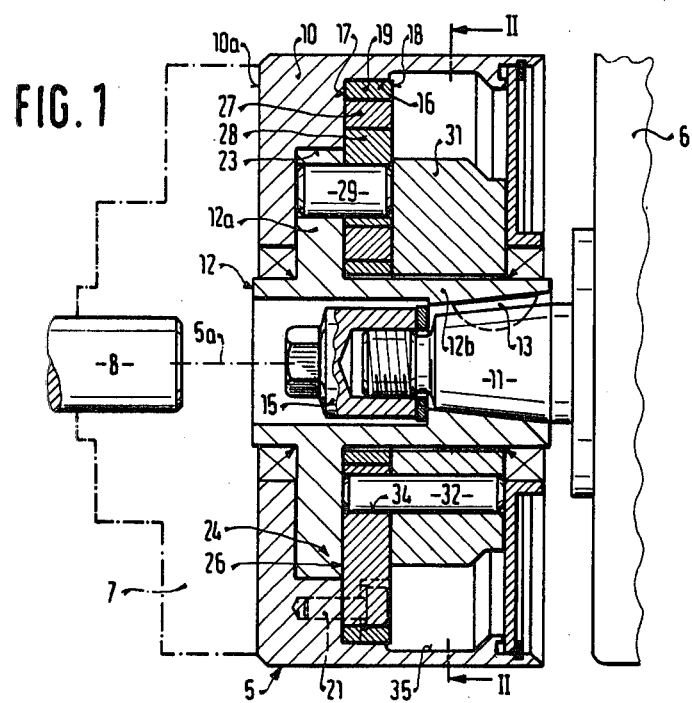
FIG. 1 is a longitudinal cross-sectional view taken through the first exemplary embodiment of the injection instant adjuster according to the invention taken along the line I—I in FIG. 2.

The injection instant adjuster 5, as may be seen from FIG. 1, is mounted on a fuel injection pump 6, shown only in part, for Diesel engines. This adjuster 5 is embodied as a closed, projecting injection adjuster and is coupled via a coupling 7 indicated by dot-dash lines, with a drive shaft 8 of the engine. Naturally, the adjuster 5 may also be embodied as an open, built-in injection adjuster intended to be built into a closed drive housing or into the gear box of the engine, if it is provided, for instance, with a gear wheel (not shown), serving as a driving element, in a known manner.

As will be described in further detail below, the injection adjuster 5 serves in a known manner to vary the mutual rotary position of two coaxial shafts in at least an rpm-dependent manner, these shafts being a driving shaft and a driven shaft, with the driven shaft either being at the same time the camshaft of the injection pump or an intermediate shaft coupled therewith. As a result of adjustment varying the rotary position of the two shafts, the instant of injection or the supply onset of the fuel injection pump can be precisely varied.

Figure 2:
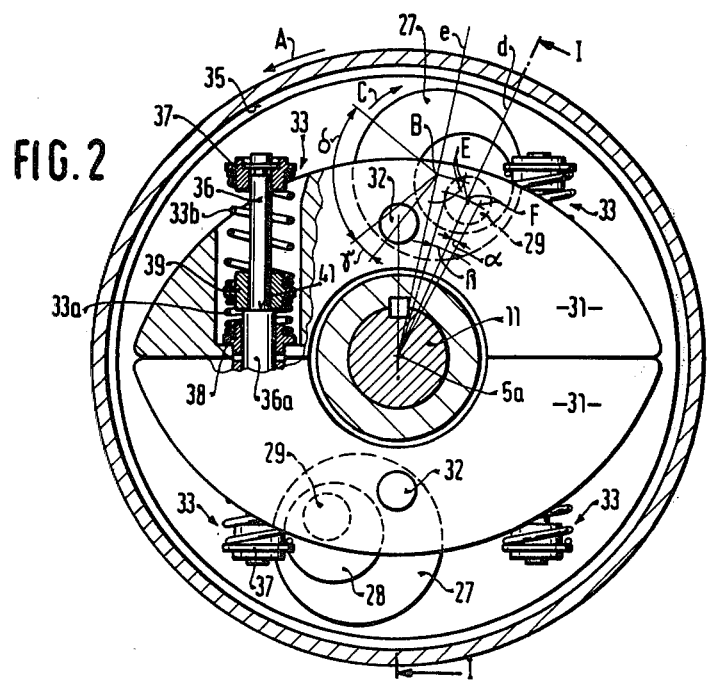
FIG. 2 is a section taken along the line II—II in FIG. 1, with flyweights shown partially in cross section and cutaway form.

In the preferred first exemplary embodiment shown in FIGS. 1 and 2, the drive shaft 8, serving as the driving shaft, is threaded by means of the coupling 7 to a housing 10, embodied as the driving element of the adjuster 5. A camshaft 11 of the fuel injection pump 6 serves as the off-drive shaft, on which an off-drive element 12 comprising a flange 12a and an adjuster hub 12b, secured against twisting by means of a plate spring 13, is secured by means of a cap nut 15.

In a hollowed-out part 16 of the housing 10, a bearing disc 19 is inserted which has two end faces 17 and 18 in parallel planes, and it is firmly connected by means of screws 21 to the housing 10. A hollow chamber having the form of an annular groove, which is formed by one end face 17 of the bearing disc 19 and by a recess 23 in the housing 10 surrounds the flange 12b and thus forms an axial and radial bearing 24 for the housing 10 acting as the driving element, against the end face 10a on which the coupling 7 is mounted.

The connection between the flange 12a, which is to be considered as part of the driven camshaft 11 and which is connected therewith in a rotationally fixed manner, and the housing 10, connected in a rotationally fixed manner with the drive shaft 8, is brought about by two cam pairs 26, rotatably supported in the bearing disc 19, each comprising one adjusting cam 27 and one compensating cam 28. The compensating cams 28 are connected with the flange 12a by means of one adjusting bolt 29 each, and they serve to compensate for the height of the arc which the center points of the adjusting bolt 29, indicated at F in FIG. 2, would attain if they were to be rotated about the center points, indicated at B of the adjusting cam 27 without the compensating cam 28. This rotary movement of the adjusting cam 27 is effected by means of two flyweights 31, disposed symmetrically relative to one another in the adjuster 5 and serving as control elements. These flyweights 31 move radially outward from the adjuster hub 12b in accordance with the increasing centrifugal force which prevails as the rpm increases, counter to the force of spring sets 33 serving as restoring means, and rotate the adjusting cams 27 via bearing pins 32 which eccentrically engage the adjusting cams 27. The bearing pins 32 are secured in the flyweights 31 and are rotatably supported in a bore 34 of the adjusting cams 27.

During the rotation of the adjusting cams 27 described above, a change in the relative rotary position between the bearing flange 12a and the bearing disc 19 takes place, as a result of which a change in rotary position is caused for the driven shaft connected with these elements, that is, the camshaft 11, relative to the drive shaft 8 of the engine. This change in rotary position, in accordance with the invention, first controls a "late" adjustment preceding the conventional "early" adjustment of the instant of injection and subsequently controls the "early" adjustment, which will be described in further detail in connection with the functioning of the adjuster.

Each of the spring sets 33 (see FIG. 2) comprises a first adjusting spring 33a, controlling the "late" adjustment, and a second adjusting spring 33b, controlling the conventional "early" adjustment. Two spring sets 33, disposed symmetrically opposite one another, are associated with each of the flyweights 31, and two each of the opposing spring sets 33 are connected with one another by means of a single spacer bolt 36. These spacer bolts 36 each have on their outermost ends one spring support 37 on which the outer two adjusting springs 33b, in the illustrated example, are supported and which thus hold the two opposing spring sets 33 of the two flyweights 31 together. The spring sets 33 are supported on the appropriate flyweight 31 via a second spring support 38, and the spring supports 38 are centered in the flyweight 31, guided on the spacer bolt 36, and, in the illustrated outset position of the flyweights 31, only the initial stress of the first adjusting spring 33a is exerted upon the spring support 38. A spring plate 39 which is disposed between the two adjusting springs 33a and 33b of each spring set 33, and the spring plate 39, in the illustrated outset position, rests against a stroke stop 41 under the influence of the initial stress of the second adjusting spring 33b. The stroke stop 41 is embodied by a section 36a of the spacer bolt 36 whose diameter is greater than the diameter of the outer ends of the spacer bolt 36. The first adjusting spring 33a may also be disposed coaxially with the spring plate 39 and the second spring 33b, having a larger diameter, may be supported on the spring support 47 (not shown). In that case, the first adjusting spring 33a also functions when the "early" adjustment is effected.

In addition to the hollow-cylindrical recess 23, which is part of the axial and radial bearing 24, and the hollowed-out portion 16, the housing 10 has a further recess 35 in the extension of the hollowed-out portion 16. This further recess 35 is embodied as an outside stop or travel limitation for the flyweights 31.

In place of the driving element 10 embodied as the adjuster housing, a similarly formed intermediate element can also be used, to which a driving gear wheel produced by the engine manufacturer can be fastened by threading, or in another manner this may be embodied directly as a driving gear wheel. An adjuster of this kind is then furnished without an oil filling, and is installed as a built-in adjuster in the gear wheels or in an appropriate intermediate housing of the engine.

The second exemplary embodiment shown in FIGS. 3 and 4, like the examples shown in FIGS. 1 and 2, is embodied as a closed, projecting adjuster 5'. Elements taken over from the first exemplary embodiment which remain the same are indicated by the same reference numerals, while those the structure of which is different but which function identically are provided with a prime. New elements are given new reference numerals. The adjusting cams 27' are supported in a flange 12a', which simultaneously serves as a bearing plate, of the off-drive element 12', and the flyweights 31 are supported on ends 29a', serving as bearing ends, of the adjusting bolts 29' which are passed through the eccentric bores 34 into the adjusting cams 27'. The adjusting bolts 29', on their ends 29b' protruding beyond the respective adjusting cams 27', each carry one slide ring 42. This slide ring 42 is slidably guided in radial slits 43 of a guide plate 44 threaded together with the housing 10' and a housing cap 45. This guide plate 44, which should be considered as a fixed component of the housing 10' serving as the driving element, is guided in turn on the adjuster hub 12b' or is fitted thereon with play, if the flange 12a' alone performs the function of radially guiding the housing 10'.

In a variant embodiment (not shown), flange 12a' may also be received between the housing cap 45 and the guide plate 44, which produces an improved axial and radial support.

In the diagram according to FIG. 5, adjusting curves a, b, c are plotted over the rpm n, these being curves which are attainable with the injection instant adjuster according to the invention. The adjusting curve a, drawn in a solid line, illustrates a "late" adjustment between the rpms $n_1$ and $n_2$ which is attainable with a single adjuster spring, and an "early" adjustment immediately following between rpms $n_2$ and $n_4$. In all the figures, the "late" adjustment is indicated with the angle $\alpha$ and the "early" adjustment is indicated by the angle $\beta$. In the case of the adjusting curve b, indicated by broken lines, and adjusting curve c, indicated by dot-dash lines, no adjustment occurs between rpms $n_2$ and $n_3$. This so-called "detent" ("rest") is generated by the initial stress of the second adjuster spring 33b, described in connection with FIG. 2, and by the function of the spring plate 39. Depending on the selection of spring rigidity of the second adjuster spring 33b, the adjusting curve b ends at rpm $n_5$ or the adjusting curve c ends at the rpm $n_4$.

The mode of operation of the injection instant adjuster according to the invention will now be described with the aid of the diagram shown in FIG. 5 and the first exemplary embodiment shown in FIGS. 1 and 2.

The rotary direction of this adjuster 5 is indicated by the arrow A in FIG. 2. In order to attain a "late" adjustment $\alpha$ in accordance with the invention which precedes the conventional "early" adjustment $\beta$ of the instant of injection, the outset position of the adjusting bolt 29 in FIG. 2 is fixed in such a manner that when the adjusting cam 27 rotates, from rpm $n_1$ on, in the direction of the arrow C, the "late" adjustment identified by $\alpha$ is controlled first. This "late" adjustment $\alpha$ is terminated at rpm $n_2$, whenever the second spring support 38 strikes against the spring plate 39. At rpm $n_2$, which may also be identified as the reversal point for the adjustment, a reversal of the adjusting direction occurs, and when there is an immediately subsequent further movement of the flyweights 31, the "early" adjustment $\beta$ occurs, which is terminated at rpm $n_4$. If the second adjusting spring 33b, in the installed position shown here, has an increased initial stress, then no adjustment will occur between rpms $n_2$ and $n_3$, and the "early" adjustment first begins at $n_3$ and ends at $n_5$ in accordance with the curve b of FIG. 5. If the second adjusting spring 33b is correspondingly less rigid in design, this "early" adjustment $\beta$ can also terminate at rpm $n_4$, as is indicated by the dot-dash curve c of FIG. 5.

As can be seen from FIG. 2, the bearing pin 32 of the adjusting cam 27 performs a first partial rotation $\gamma$ of the adjusting cam 27, which controls the "late" adjustment $\alpha$, between rpms $n_1$ and $n_2$. Subsequent to this partial rotation, the center point B of the adjusting cam 27, the center point E of the compensating cam 28 and the center point F of the adjusting bolt 29 lie in a straight line with one another. When there is a further partial rotation, identified by the angle $\alpha$, of the adjusting cam 27, then the subsequent "early" adjustment $\beta$ is controlled. During these sequential adjusting movements, first the distance between a connecting line d from the adjusting shaft 5a to the center point F of the adjusting bolt 29 and a connecting line e from the adjuster shaft 5a to the center point B of the adjusting cam 27 increases by the angle $\alpha$ in the direction of the desired "late" adjustment of the instant of injection. Subsequently, while the rotational direction C of the adjusting cam 27 remains the same, a decrease of this distance occurs, by the amount of the angle $\beta$ in the direction of the desired "early" adjustment. A second design criterion for this injection adjuster 5 is that in the outset position of the adjusting cam 27, the center point E of the compensating cam 28, viewed in the rotational direction C of the adjusting cam 27, is located before a connecting line between the center point F of the adjusting cam 29 and the center point B of the adjusting cam 27; in the same outset position, the variable distance between the two latter center points F and B is greater than the constant distance between the center points E and B of the compensating cam 28 and the adjusting cam 27.

The described angles and center points, as well as the connecting lines, are indicated in FIG. 2, and in the illustration of the adjusting movement, the adjuster shaft 5a and the center point B of the adjusting cam are retained as fixed points in their illustrated position.

The mode of operation of the adjuster 5' described as the second exemplary embodiment is simpler to illustrate. Here, the adjuster shaft 5a and the position of the guide plate 44, which is connected with the driving element 10' in a rotationally fixed manner and carries the slits 43, are assumed to be fixed. During the radially outward-directed movements of the flyweights 31 which occur during adjustment, the adjusting cam 27' is rotated in the direction of the arrow C, and the center point B of the adjusting cam 27' moves during the first partial rotation, identified by $\gamma$ of the adjusting cam 27' and intended for the purpose of "late" adjustment of the instant of injection, by the amount of the angle $\alpha$ into the position indicated by B'. In so doing, the distance between the connecting line d, which here passes through the plane of separation on line III—III, from the adjuster shaft 5a to the center point F of the adjusting bolt 29' and the connecting line e from the adjuster shaft 5a to the center point B of the adjusting cam 27' has increased. When the rotational direction C of the adjusting cam 27' remains the same, this distance is subsequently decreased in the direction of the desired "early" adjustment by the amount of the angle $\beta$ indicated in FIG. 4. Thus, in both adjusters 5 and 5', a "late" adjustment $\alpha$ preceding the conventional "early" adjustment $\beta$ is controlled without additional structural parts, and the cam disposition according to the invention may also be applied if instead of the flyweights 31 or in addition thereto, hydraulic adjusting pistons, acting as control elements, engage the adjusting cams 27, 27'. In place of the two adjusting cams 27, 27' present in these exemplary embodiments, it is also possible for more adjusting cams to be built in, for instance three or up to six adjusting cams.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An injection instant adjuster for Diesel internal combustion engines arranged to vary the mutual rotary position of a driven shaft connected with a fuel injection pump relative to a driving shaft in accordance at least with rpm, said adjuster having at least one control element actuatable counter to the force of a restoring means and having at least one adjusting cam rotatable by said control element and connected between a driving member and a driven element of the adjuster, said adjusting cam further being supported in one of said adjuster elements and coupled with the other element via an eccentric adjusting bolt, characterized in that to attain a "late" adjustment ($\alpha$) preceding the conventional "early" adjustment ($\beta$) of the instant of injection, the outset position of means cooperating with said adjusting cam is designed so that the distance between a connecting line (d) from an axial center of said shafts to the center point (F) of said last-named means and a connecting line (e) from said axial center of said shafts to the center point (B) of said adjusting cam is at first increased, when the rotational direction (C) of said adjusting cam remains the same, in the direction of the "late" adjustment ($\alpha$) of the instant of injection and is subsequently decreased in the direction of "early" adjustment ($\beta$).

2. An injection adjuster as defined by claim 1, wherein said means is associated with a compensating cam and supported eccentrically in said adjusting cam, characterized in that in the outset position of said adjusting cam the center point (E) of the compensating cam is located before a connecting line between the center point (F) of said means and the center point (B) of said adjusting cam, and in the same outset position the variable distance between the two latter center points (F and B) is greater than the constant distance between the center points (E and B) of said compensating cam and said adjusting cam.

3. An injection adjuster as defined by claim 2, characterized in that after a first partial rotation ($\gamma$) of said adjusting cam controlling the "late" adjustment ($\alpha$), the center points (B, E and F) of said adjusting cam, compensating cam and said means are located on a straight line, and that the "early" adjustment ($\beta$) is controllable during a further partial rotation ($\delta$).

4. An injection adjuster as defined by claim 1, having said means guided in a radial slit of a guide plate, characterized in that after a first partial rotation ($\gamma$) of said adjusting cam, controlling the "late" adjustment ($\alpha$), a radius (f) of said adjusting cam defined by said center points of said adjusting cam and said means is located perpendicularly on a connecting line (d) between the center of the adjuster (5a) and said means.

5. An injection adjuster as defined by claim 1, having at least two flyweights, engaging the adjusting cams counter to the force of adjusting springs acting as restoring means, said flyweights acting as control elements, characterized in that said adjusting springs comprise spring sets, at least one first adjuster spring of said set controlling only the "late" adjustment ($\alpha$) up to the point of contact of the flyweights on a spring plate and a second adjuster spring of said set controlling the "early" adjustment ($\beta$) and being compressible by the flyweight and said spring plate.

6. An injection adjuster as defined by claim 5, characterized in that said spring plate, in its outset position, is held on a stop means by said second adjuster spring.

7. An injection adjuster as defined by claim 6, characterized in that said second adjuster spring, in the outset position of the spring plate further includes an initial stressing force, which is greater than the spring force of said first adjuster spring when said flyweight is resting on the spring plate.

8. An injection adjuster as defined by claim 5, characterized in that said spring plate is secured between said two sets of adjuster springs.

* * * * *